United States Patent [19]

Iwasawa

[11] Patent Number: 5,110,085
[45] Date of Patent: May 5, 1992

[54] GAS VENTING DEVICE FOR FOAM MOLD

[75] Inventor: Toshio Iwasawa, Kanagawa, Japan

[73] Assignee: Bridgestone Corporation, Tokyo, Japan

[21] Appl. No.: 437,135

[22] Filed: Nov. 16, 1989

[30] Foreign Application Priority Data

Nov. 16, 1988 [JP] Japan .................. 63-287516
Sep. 19, 1989 [JP] Japan .................. 1-240616

[51] Int. Cl.⁵ .......................................... F16K 31/124
[52] U.S. Cl. ............................... 251/29; 60/416;
91/461; 425/159; 425/812
[58] Field of Search ................... 251/26, 29, 28;
249/141; 425/155, 159, 812, 817 R; 60/416;
91/461; 137/624.11, 624.13, 624.15

[56] References Cited

U.S. PATENT DOCUMENTS

| | | | |
|---|---|---|---|
| 2,591,839 | 4/1952 | Levy | 60/416 |
| 2,825,306 | 3/1958 | Buri | 251/29 |
| 3,156,255 | 11/1964 | Gasquet et al. | 251/26 |
| 3,960,059 | 6/1976 | Schexnayder | 91/461 |
| 4,065,094 | 12/1977 | Adams | 251/26 |
| 4,113,415 | 9/1978 | Holly | 425/812 |
| 4,143,851 | 3/1979 | Lange | 251/29 |
| 4,161,135 | 7/1979 | Garlinghouse | 91/461 |
| 4,372,193 | 2/1983 | Hall | 91/461 |
| 4,479,914 | 10/1984 | Baumrucker | 425/812 |
| 4,526,085 | 7/1985 | Morizur et al. | 91/461 |
| 4,621,496 | 11/1986 | Lamb | 251/29 |
| 4,637,587 | 1/1987 | Kuhnlein | 251/29 |
| 4,779,667 | 10/1988 | Fujino et al. | 425/812 |
| 4,782,886 | 11/1988 | Uchida et al. | 425/812 |
| 4,787,436 | 11/1988 | Ozeki et al. | 425/812 |
| 4,923,666 | 5/1990 | Yamazaki et al. | 425/812 |
| 4,923,667 | 5/1990 | Sayer | 425/812 |
| 4,935,191 | 6/1990 | Baxi | 425/812 |

FOREIGN PATENT DOCUMENTS

| | | |
|---|---|---|
| 60-257211 | 12/1985 | Japan . |
| 61-158412 | 1/1986 | Japan . |
| 62-154908 | 1/1987 | Japan . |
| 3109017 | 5/1988 | Japan .............. 425/812 |

Primary Examiner—George L. Walton
Attorney, Agent, or Firm—Sughrue, Mion, Zinn Macpeak & Seas

[57] ABSTRACT

A gas venting device serves to automatically closing and opening vent holes of a foam mold so that air and reaction product gases are sufficiently exhausted and a foamed product is effectively prevented from extending through the vent holes. The gas venting device includes valves for closing and opening the vent holes, valve driving cylinders for driving the valves, a pilot operated two-position change-over valve, pressure tanks connected through the pilot operated two-position change-over valve to the valve driving cylinders, and mechanical change-over valves connected to the pilot operated two-position change-over valve for changing over it by dogs provided on a passage of the foam mold. The device further includes an air timer for delaying closing the vent holes by the valves.

5 Claims, 4 Drawing Sheets

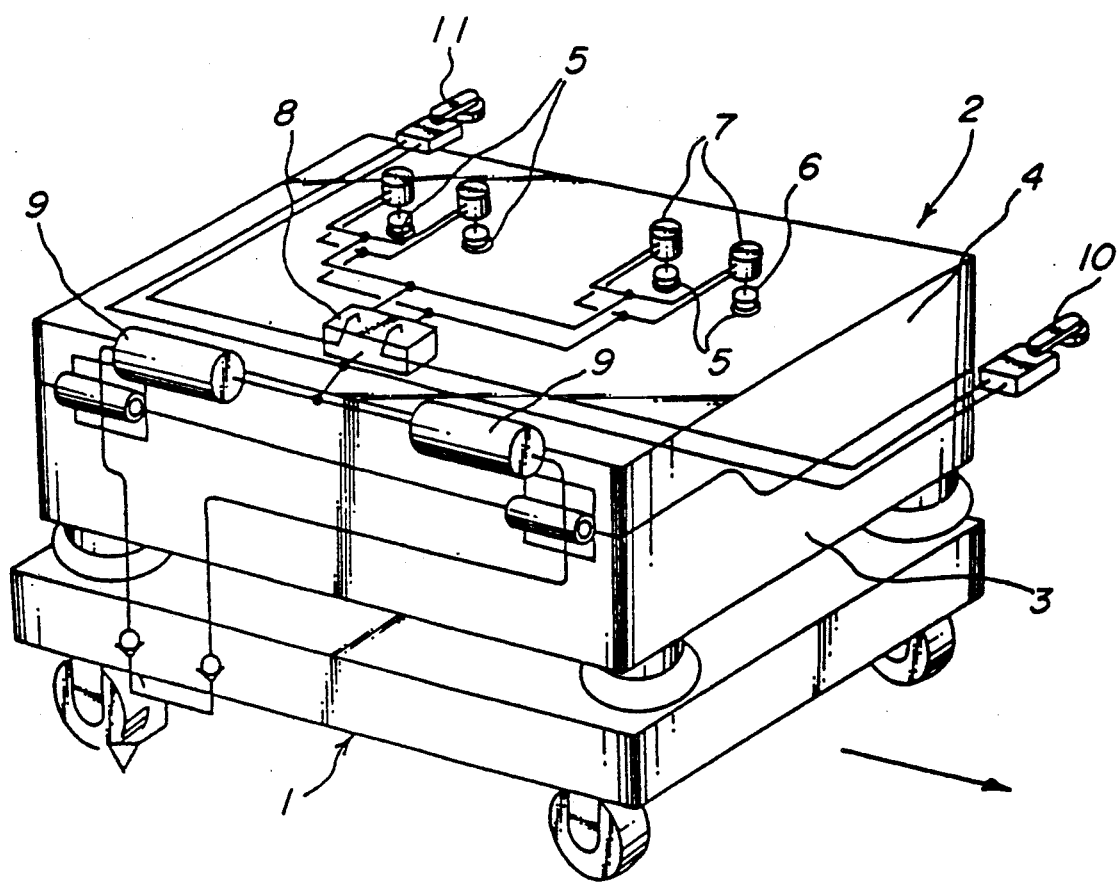
FIG_1a

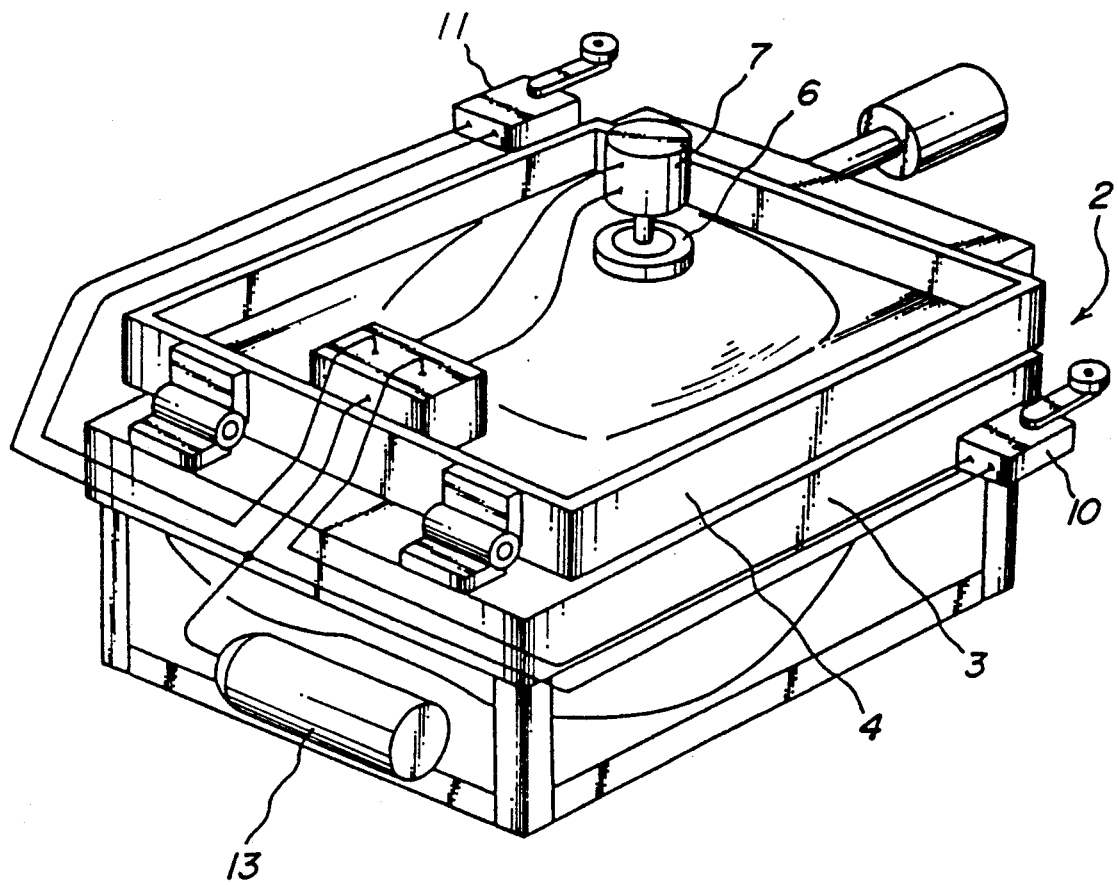
FIG_2

GAS VENTING DEVICE FOR FOAM MOLD

BACKGROUND OF THE INVENTION

This invention relates to a venting device for a foam mold for example for urethane foam. More particularly it relates to a venting device capable of sufficiently exhausting air and reaction product gases in a cavity of a foam mold and simultaneously effectively preventing a foaming material from extending from vent holes of the foam mold.

Hitherto used venting devices for foam molds have been disclosed for example in Japanese Utility Model Application Laid-open Nos. 62-154,908 and 61-158,412 and Japanese Patent Laid-open No. 60-257,211.

In the Japanese Utility Model Application Laid-open No. 62-154,908, spot facings are provided at vent holes formed in an upper mold half of a foam mold, thereby making easy removal of protrusions of a foamed product which have extended from the vent holes and hardened. In the Japanese Utility Model Application Laid-open No. 61-158,412, vent holes provided in an upper mold half are closed by plugs when upper and lower mold halves are closed together. In the Japanese Patent Application Laid-open No. 60-257,211, protrusions of a foamed product extended from vent holes of an upper mold half are removed by mechanically scratching them.

In the first disclosed feature, however, it would take a lot of man-hours for the removal of the protrusions of the foamed product. What is worse still it is very difficult to completely remove the protrusions of the foamed product. This also hold true in the third disclosed feature. It is in practice impossible to remove all protrusions completely by simple scratching.

In the second disclosed feature, moreover, it is difficult to obtain an accuracy for exactly inserting all the plugs into vent holes. In most cases, the plugs and the vent holes are not in alignment with each other.

SUMMARY OF THE INVENTION

It is an object of the invention to provide an improved gas venting device for a foam mold, which effectively solves the problems of the prior art a above described and is applicable to foam molds of external heating system, direct heating system and other systems.

It is another object of the invention to provide a gas venting device for a foam mold, which enables vent holes of a foam mold arranged on a trolley passing through an oven to be automatically closed and opened by valves to sufficiently exhaust air and reaction product gases in a cavity of the foam mold and to effectively prevent a foamed product from extending through the vent holes, thereby ensuring proper foam molding and mostly or completely eliminating men-hours for removing operations of protrusions of the foamed product.

In order to achieve these objects, the gas venting device for a foam mold defining therein a mold cavity and having at least one vent hole formed in an upper mold half of the foam mold according to the invention comprises a valve for closing and opening a vent hole, a valve driving cylinder for driving the valve for closing and opening the vent hole, a main change-over valve for controlling the valve driving cylinder, pressure accumulating means connected through the main change-over valve to the valve driving cylinder, and change-over means connected to the main change-over valve for changing over it by external inputs.

Between the valve driving cylinder and the main change-over valve is preferably provided an air timer for delaying closing action of the valves for the vent holes.

With the gas venting device according to the invention, a foaming material is poured into a foam mold positioned and arranged on a trolley and the foam mold is closed. After air and reaction product gases in a cavity of the foam mold have been sufficiently exhausted through opened vent holes, the change-over means constructed by for example limit switches are actuated by external input by dogs to shift the main change-over valve such as a magnetic valve. As a result, the pressure in the pressure accumulating means is supplied into valve closing sides of the valve driving cylinders to close the vent holes, thereby effectively preventing a foamed product from extending through the vent holes.

When the air timer is interposed between the main change-over valve and the valve driving cylinders, the change-over means is actuated for example immediately after the completion of mold closing operation, and after the lapse of a predetermined time during which the reaction product gases have been sufficiently exhausted, the vent holes are closed by the valves with the aid of the operation of the air timer.

Therefore, according to the invention proper foam molding can be effected for producing foamed products whose shapes are exactly coincident with a contour of the cavity of the foam mold and at the same time extension of the foamed products through the vent holes is substantially prevented. In case that the main change-over valve is a pilot operated change-over valve and the change-over means is mechanical change-over valves connected to the pressure accumulating means for controlling the pilot pressure supplied into and exhausted from the pilot operated change-over valve, it is possible to completely eliminate a risk of power supply equipment, electric control circuits and the like being damaged due to a heating oven heated at about 50°-100° of a race track type or turn table type production installation. Therefore, exact closing and opening of the valves are ensured without requiring particular maintenance for a long period of time.

Moreover, in case that the change-over valves are two limit switches or two mechanical change-over valves, the foaming of the foaming material poured in the cavity of the foam mold is substantially completed with the vent holes closed by the valves by an action of one limit switch or one mechanical change-over valve, and before opening the foam mold, reaction product gases in the foamed product are exhausted through the vent holes which are opened by the valves again actuated by an action of the other limit switch or the other mechanical change-over valve. As a result, a danger of an upper mold half being rapidly raised by the foamed product due to high inner pressure in opening the foam can be completely removed.

The invention will be more fully understood by referring to the following detailed specification and claims taken in connection with the appended drawings.

BRIEF DESCRIPTION OF THE DRAWINGS

FIG. 1a is a perspective view of one embodiment of the device according to the invention;

FIG. 2 is a perspective view illustrating another embodiment of the invention.

EXPLANATION OF THE PREFERRED EMBODIMENTS

Figure 1B:
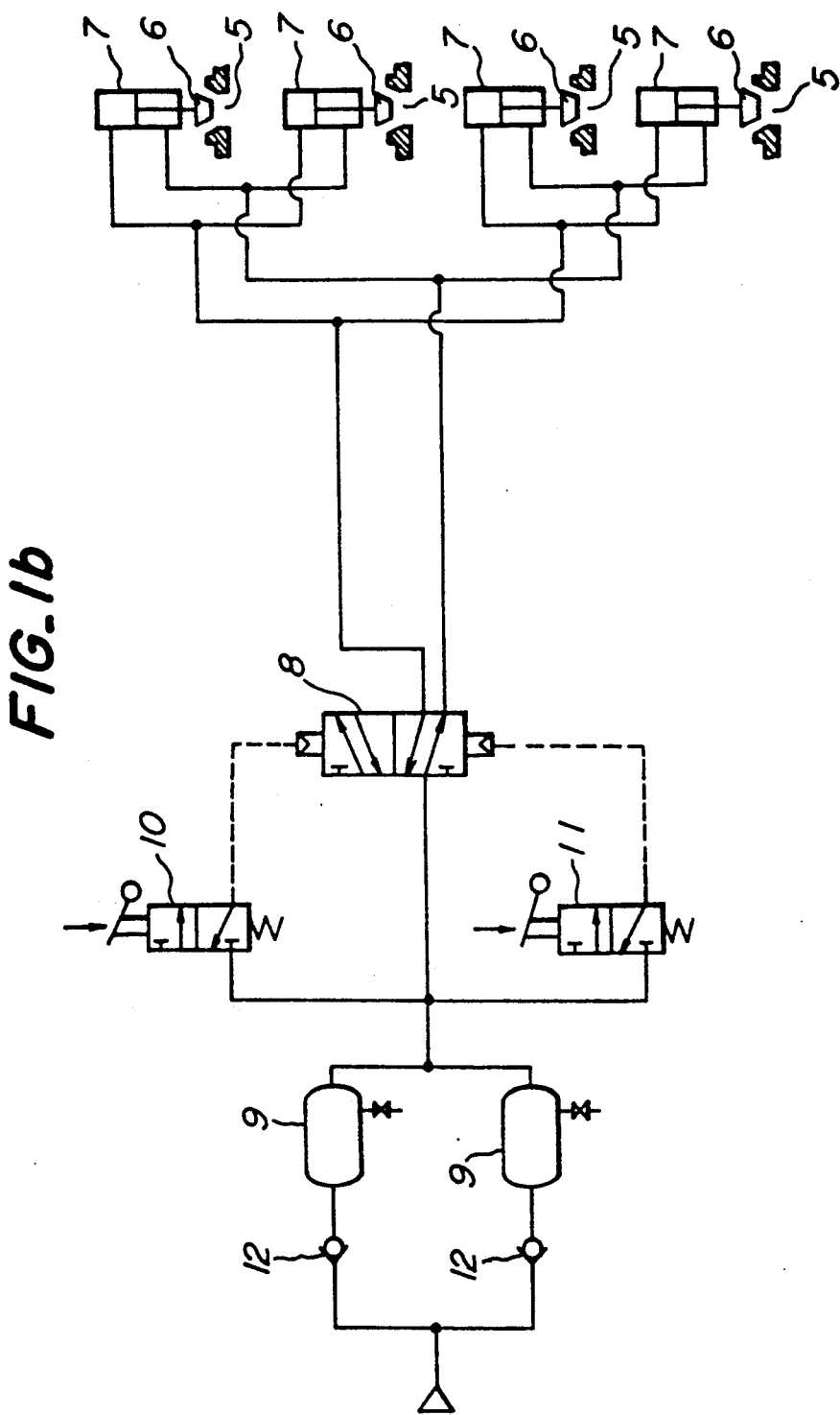
FIG. 1b is a view illustrating a fluid circuit used in the device according to the invention.

FIG. 1a illustrates one embodiment of a device according to the invention and FIG. 1b shows a fluid circuit used in the device.

Referring to FIG. 1a, the device includes a trolley 1 moving on a track of a race track type or turn table type production installation, and a foam mold 2 positioned and fixed on the trolley 1 through elastic support means. The foam mold comprises a lower mold half 3 and an upper mold half 4 hinged with each other. The upper mold half is formed with vent holes 5 for communicating a mold cavity (not shown) of the mold 2 with atmosphere.

Valves 6 are provided at exits of the vent holes 5 for controlling closing and opening of the vent holes, respectively as shown in FIG. 1b. These valves 6 are connected to rod ends of small air cylinders 7, respectively for driving the valves 6 to close and open the vent holes 5. These air cylinders 7 are connected through for example pilot operated two-position change-over valves 8 to air accumulating means, such as two air tanks 9 in this embodiment. The pilot operated two-position change-over valves 8 is connected to change-over means comprising two mechanical change-over valves 10 and 11 also connected to air tanks 9.

With this arrangement, when one mechanical change-over valve 10 is shifted downwardly viewed in FIG. 1b against a spring force of a built-in spring by a dog urging a lever of the mechanical change-over valve 10, the pilot operated two-position change-over valve 8 is supplied with pilot pressure from the air tanks 9 to be shifted downwardly from a position shown in FIG. 1b. As a result, the inner pressure in the air tanks 9 is supplied onto head ends of the air cylinders 7 to close the vent holes 5 by the valves 6.

When the external force acting on the mechanical change-over valve 10 by the dog is removed owing to a movement of the trolley 1, the change-over valve 10 is returned to the original position shown in the drawing by the action of the built-in spring so that the supply of the pilot pressure to the pilot operated two-position change-over valve 8 is stopped. However, the pilot operated two-position change-over valve 8 once shifted is kept at the shifted position by the pressure acting upon its spool. Therefore, the closing of the vent holes 5 by the valves 6 is maintained until the pilot operated two-position change-over valve 8 is forced in a reverse direction.

On the other hand, where the other mechanical change-over valve 11 is shifted downwardly from the position shown in FIG. 1b by a dog, the pilot operated two-position change-over valve 8 is shifted, from the position above described into the position shown in the drawing by the pilot pressure acting thereupon. As a result, the inner pressure in the air tanks is supplied onto rod ends of the air cylinders 7 to open the vent holes 5 by the valves 6. Moreover, the opened condition of the vent holes 5 by the valves 6 is maintained even after the change-over valve 11 has been returned to the position shown in FIG. 1b by its built-in spring.

In this embodiment, the air tanks 9 are connected through check valves 12 to a pressurized air supply source so that air tanks 9 can be replenished with pressurized air, when required.

In using the gas venting device constructed as described, first the pressurized air is supplied from the supply source to the respective air tanks 9, and then the valves 6 are actuated to open the vent holes 5 as shown in FIG. 1b by manually operating, for example, the mechanical change-over valve 11. Under such a condition, pouring a foaming stock solution into the lower mold 3 and closing the upper and lower mold halves 4 and 3 are carried out in succession and thereafter the trolley 1 is moved into a heat insulating oven or a heating oven.

During such movement of the trolley, at an instant when remaining air and reaction product gases have been sufficiently exhausted, the other mechanical change-over valve 10 is shifted by a dog (not shown) provided in a passage of the trolley 1 so that the pilot operated two-position change-over valve 8 is also shifted as above described to actuate the valves 6 to close the vent holes 5 by supplying the air pressure onto head ends of the air cylinders 7.

With these operations, it is possible to obtain a foamed product as expected having no defects such as surface recesses. Moreover, any protrusions of the foamed product from the vent holes 5 is substantially completely prevented by closing the vent holes 5 by the valves 6 in an uninterrupted reliable manner.

After completion of foam molding in the closed condition of the vent holes 5 by the valves 6 and prior to opening of the foam mold, the other mechanical change-over valve 11 is shifted by a dog (also not shown) to displace the pilot operated two-position change-over valve 8 into the position shown in FIG. 1b so that inner pressure in the cavity of the mold and hence inner pressure in the foamed product are effectively exhausted. As a result, the opening of the mold can be effected very safely without being detrimentally subjected to the inner pressure in the foamed product.

After completion of opening the mold, removal of the mold and cleaning are carried out. Thereafter, the series of the operations such as the pouring of the foaming stock solution and other operations following thereto are repeatedly effected. If the inner pressure in the air tank lowers below a predetermined value, the air tank 9 is replenished with pressurized air.

FIG. 2 illustrates another embodiment of the invention. In the embodiment, a cartridge type pressurized cylinder 13 as an accumulating means is attached to a foam mold 2 and the number of vent holes and hence the number of valves 6 and air cylinders 7 are reduced to only one, respectively.

In this embodiment, by providing an air circuit similar to that shown in FIG. 1b, the same functions and effects can be obtained.

In this embodiment, when the air pressure in the pressurized cylinder 13 lowers, the cylinder may be replaced with a new one.

Figure 3:
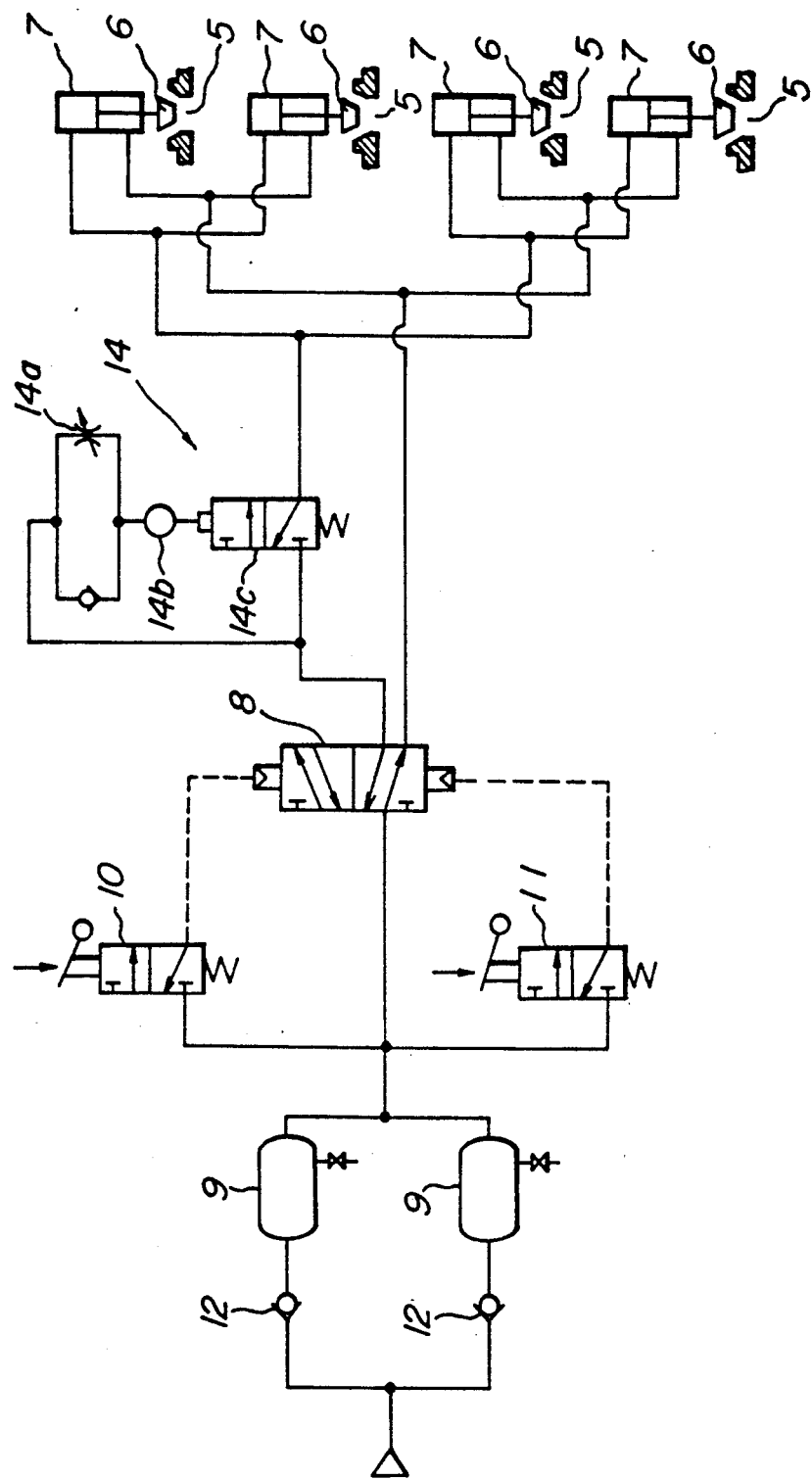
FIG. 3 is a view showing a fluid circuit having an air timer for a device of a further embodiment of the invention.

FIG. 3 illustrates an air circuit of a further embodiment of the invention. In this circuit, an air timer 14 is provided between a pilot operated two position change-over valve 8 and head ends of respective cylinders 7 of an air circuit similar to that shown in FIG. 1b.

With this embodiment, after a mechanical change-over valve 10 is actuated to shift the pilot operated two-position change-over valve 8 downwardly viewed in FIG. 3, air supply into the head ends of the air cylinders 7 from air tanks 9 is delayed by an action of the air timer 14. As can be seen from FIG. 3, the air timer 14 has a variable throttle 14a, an accumulator 14b and a change-over valve 14c. Therefore, the air timer 14 permits the inner pressure in the air tanks 9 to be supplied into the head ends of the air cylinders 7 only when the inner pressure supplied from the air tanks 9 through the variable throttle 14a into the accumulator 14b sifts the change-over valve 14c against a spring force of the valve 14c.

According to this embodiment, therefore, by adjusting the variable throttle 14a, the time from the actuation of the mechanical change-over valve 10 to the closing operation of the valves 6 can be suitably selected, if required. It is also possible, for example, to operate the mechanical change-over valve 10 immediately after closing the foam mold including the foaming stock solution poured therein.

As can be seen from the above description, the device according to the invention aids the foaming material in stably growing in a free condition to produce a foamed product having no defects as voids, traps and the like. A low density foamed product can be obtained. Moreover, by hermetically closing vent holes by the valves it is possible to close the vent holes with high accuracy so that protrusions unintentionally formed on foamed products can be effectively prevented.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A gas venting device for a foam mold defining therein a mold cavity and having an upper mold half formed with at least one vent hole therein, comprising: a valve for closing and opening said at least one vent hole of said foam mold; a valve driving cylinder for driving said at least one valve for closing and opening said at least one vent hole; a main change-over valve for controlling the valve driving cylinder; pressure accumulating means connected through the main change-over valve to the valve driving cylinder; change-over means connected to the main change-over valve for changing-over said main change-over valve by external inputs; timer means for actuating the main change-over valve with a variable delay time; and said gas venting device together with said foam mold being mounted on a trolley, said trolley movable through an oven, whereby said gas venting device is actuated as said trolley is moved by activating said change-over valve.

2. A gas venting device as set forth in claim 1, wherein said main change-over valve is a pilot operated change-over valve, and the change-over means is a mechanical change-over valve connected to the pressure accumulating means for supplying pilot pressure into and exhausting from the pilot operated change-over valve.

3. A gas venting device as set forth in claim 1, wherein said pressure accumulating means comprises a cartridge type pressurized air tank attached to said foam mold.

4. A gas venting device as set forth in claim 1, wherein, said timer means comprises an air timer which is arranged between said valve driving cylinder and said main change-over valve.

5. A gas venting device as set forth in claim 4, wherein said air timer comprises a variable throttle, an accumulator and a change-over valve which are connected in series with each other, said change-over valve of the air timer being interposed between said valve driving cylinder and said main change-over valve.

* * * * *